United States Patent Office 3,372,197
Patented Mar. 5, 1968

3,372,197
ISOMERIZATION OF DISUBSTITUTED CYCLOHEXANONES
Francis Johnson, Newton Lower Falls, Mass., assignor to The Dow Chemical Company, Midland, Mich., a corporation of Delaware
No Drawing. Filed Dec. 11, 1964, Ser. No. 417,765
7 Claims. (Cl. 260—586)

This invention relates to processes for converting the more stable geometric isomers of 2-substituted cyclic ketones to less stable isomers.

It is known that 2-substituted cyclic ketones having at least one other substituent on the ring but having only one substituent in the 2-position, e.g., 2-alkylcyclohexanoes having at least one substituent in a position 3-6, can exist in two isomeric forms, these being cis- and trans-forms respectively. They normally are obtained in the thermodynamically most stable form, this being either cis or trans or an equilibrium mixture of the two in which one or the other predominates. To convert this stable form to a less stable form requires energy. The present invention is directed to a novel method for supplying this energy.

According to the invention, a 2-substituted cycloalkanone in a more stable configuration is converted to a less stable isomeric form by (1) forming an enamine by condensing the ketone with a secondary amine and (2) hydrolyzing the enamine in a mildly acidic aqueous medium, i.e., one having a pH of about 1-6. It is believed that the first step of the process provides the required energy and effects the isomerization. The second merely regenerates the ketone, and its only requirement is that it be effected under conditions such that reversion of the product to the more stable form does not occur. For this reason, the second step is conducted at a pH below about 6 and a temperature below about 100° C., the preferred condition being pH of 1-3 and temperature of 0-25° C. Reversion is also minimized by minimizing the reaction time in Step 2. The time required for substantially complete hydrolysis depends largely on temperature and pH and may vary from a few minutes to several hours.

Step 1, the reaction of the ketone with a secondary amine to form an enamine, is a well known process and is conveniently effected by heating a mixture of the reactants, preferably in the presence of an acidic or a basic catalyst, under conditions whereby water of reaction is removed until the reaction is substantially complete, as evidenced by the production of the theoretical amount of water. A typical such reaction is described by Johnson et al., J. Am. Chem. Soc., 86, 118 (1964).

Step 2 is simple hydrolysis of the enamine to regenerate the ketone and may be effected in any manner so long as the conditions are not so drastic as to cause isomerization of the product to the more stable form, as pointed out above. Since both the enamine and the amine formed in the hydrolysis are basic in reaction, and since bases catalyze reversion of the product to the more stable form, it is essential that Step 2 be effected under acidic conditions. This is conveniently assured by carrying out the reaction in a homogeneous, acidic, preferably buffered, aqueous solution. Since most cyclic ketones are relatively insoluble in water alone, it is convenient to use aqueous alcohol, dioxane, dimethylformamide, or the like, as the solvent to assure a homogeneous system. The desired acidic pH may be attained by the use of any suitable acid or acidic salt, such as, for instance HCl, $H_2SO_4$, $H_3PO_4$, $NaHSO_4$, $KH_2PO_4$, or an organic acid, such as acetic, succinic, benzoic or phthalic acid.

The practice of the invention is illustrated by the following examples.

*Example 1*

Equilibrated (93% cis) 2,4-dimethylcyclohexanone was converted to the pyrrolidine enamine by heating it with excess pyrrolidine in the presence of a strong acid ion exchange resin (Dowex 50) and continuously removing the water that was formed.

To 10 g. of the enamine there was added, with rapid stirring, 250 ml. of a 10% aqueous solution of KCl that had been acidified with HCl to pH 2. The mixture, at room temperature, was stirred for 30 minutes, after which 100 ml. of ligroin was added and stirring was continued for 90 minutes more. The aqueous phase was separated, extracted twice with fresh ligroin and discarded. The combined ligroin extracts were washed with water, dried and evaporated on a steam bath and under vacuum. The residue (6.3 g.) was distilled at 68° C. (14 mm.) and had $n_D^{25}=1.4476$. Infrared analysis confirmed the identity and purity of the product. Gas-liquid chromatograph showed it to contain 90% of the trans isomer of 2,4-dimethylcyclohexanone.

*Example 2*

The procedure of Example 1 was repeated except that morpholine instead of pyrrolidine was used to make the enamine.

The product was 6.2 g. of 2,4-dimethylcyclohexanone containing 85% of the trans isomer.

*Example 3*

When the procedures of Examples 1 and 2 were repeated except that the hydrolysis step was conducted at pH 4 (a 15% aqueous solution of sodium acetate acidified to pH 4 with acetic acid), the yield of trans isomer was somewhat reduced.

*Example 4*

When the procedure of Example 3 was repeated at pH 6 (an aqueous solution of a mixture of potassium dihydrogen phosphate and dipotassium hydrogen phosphate), the yield of trans isomer was somewhat further reduced.

*Example 5*

The procedure of Example 2 was repeated except that the ketone used was 2-methyl-4-tert.-butylcyclohexanone and the reaction time prior to the addition of ligroin was extended to 2 hours.

The product was 6.9 g. of essentially pure trans-2-methyl-4-tert.-butylcyclohexanone.

Other unstable isomers of disubstittued cyclohexanones that can be prepared by the method of the invention include cis-2,3-dimethyl-, trans-2,6-dimethyl-, cis-2,5-dimethyl-, trans-2-phenyl-4-methyl-, trans-2-methyl-4-phenyl- and cis-2-isopropyl-5-methylcyclohexanones and the like, and in general, any disubstituted cyclohexanone having one, and only one, substituent in the 2-position and in which the substituents are inert in the process. Such inert substituents include alkyl, alkoxy, alkylthio, aryl, aryloxy and arylthio groups, particularly the lower (1–4 carbons) alkyl, alkoxy and alkylthio groups and phenyl, phenoxy and phenylthio groups.

The cyclic ketone need not be a cyclohexanone but may be any cycloalkanone capable of existing in cis and trans forms. Thus it may be a cyclopentanone or cycloheptanone and may bear any inert substituents as set forth above.

While the cycloalkanone must have two substituents, it may have more than two, and, in fact, additional substituents facilitate the operation of the process.

Since the function of the amine group in the enamine is essentially a steric one, and since even a small one, such as dimethylamine, is effective, substantially any secondary amine can be used provided it is sufficiently basic to form the enamine and is free of reactive groups that would interfere with the process. As a matter of convenience, the preferred amines are the heterocyclic amines, such as pyrrolidine, piperidine, morpholine, and the like, and the dialkylamines, such as dimethyl-, diethyl-, dibutyl- and diisopropylamine.

I claim:
1. The process for converting a disubstituted cyclohexanone having one and only one substituent in the 2-position, each substituent being alkyl, alkoxy, alkylthio, aryl, aryloxy or arylthio, from a more stable to a less stable cis-trans isomer comprising
   (1) reacting by contacting the cyclohexanone with a member selected from the group consisting of dialkylamines, pyrrolidine, piperidine and morpholine to produce the corresponding enamine and
   (2) hydrolyzing the enamine in an aqueous medium at a pH of not more than 6 and a temperature of not more than 100° C.
2. The process of claim 1 wherein the ketone is a 2-alkylcyclohexanone wherein the alkyl group has up to 4 carbon atoms.
3. The process of claim 1 wherein the amine is a dialkylamine.
4. The process of claim 1 wherein the amine is a member selected from the group consisting of pyrrolidine, piperidine and morpholine.
5. The process of claim 1 wherein the pH in Step 2 is 1-3.
6. The process for converting 2,4-di(lower alkyl)cyclohexanone from the cis to the trans isomeric form comprising (1) reacting the cis-isomer with pyrrolidine, piperidine, morpholine or a lower dialkylamine, thus to form an enamine of the ketone and (2) hydrolyzing the enamine in an aqueous medium at a pH of not more than 6 and a temperature not exceeding 100° C.
7. The process for converting cis-2,4-dimethylcyclohexanone to the trans-isomer comprising (1) reacting it with pyrrolidine or morpholine, thus to produce an enamine of the ketone and (2) hydrolyzing the enamine at a pH of 1-3 and a temperature of 0-25° C.

References Cited

Rapheal et al.: "Adv. in Organic Chem.," vol. 4, pp. 21, 90 and 100 (1963).

LEON ZITVER, *Primary Examiner.*

M. JACOB, *Assistant Examiner.*